United States Patent
Kim et al.

(10) Patent No.: US 10,275,473 B2
(45) Date of Patent: Apr. 30, 2019

(54) METHOD FOR LEARNING CROSS-DOMAIN RELATIONS BASED ON GENERATIVE ADVERSARIAL NETWORKS

(71) Applicant: SK TELECOM CO., LTD., Seoul (KR)

(72) Inventors: Taek Soo Kim, Seoul (KR); Moon Su Cha, Seoul (KR); Ji Won Kim, Seoul (KR)

(73) Assignee: SK TELECOM CO., LTD., Seoul (KR)

( * ) Notice: Subject to any disclaimer, the term of this patent is extended or adjusted under 35 U.S.C. 154(b) by 80 days.

(21) Appl. No.: 15/673,052

(22) Filed: Aug. 9, 2017

(65) Prior Publication Data

US 2018/0314716 A1    Nov. 1, 2018

(30) Foreign Application Priority Data

Apr. 27, 2017 (KR) .................. 10-2017-0054474

(51) Int. Cl.
  *G06K 9/40* (2006.01)
  *G06F 17/30* (2006.01)
  *G06T 7/246* (2017.01)
  *G06T 1/20* (2006.01)
  *G06T 1/00* (2006.01)

(52) U.S. Cl.
  CPC .... *G06F 17/30277* (2013.01); *G06F 17/3028* (2013.01); *G06T 1/0007* (2013.01); *G06T 1/20* (2013.01); *G06T 7/248* (2017.01)

(58) Field of Classification Search
  CPC ........ G06N 3/0454; G06N 3/08; G06N 3/084; G06N 3/04; G06N 3/088; G06N 3/06; G06N 3/063; G06N 3/004; G06N 3/0445; G06N 3/0481; G06N 99/005; G06N 5/046; G06K 9/66; G06F 17/30277; G06F 17/3028; G06T 1/0007; G06T 1/20; G06T 1/00; G06T 3/4046
  See application file for complete search history.

(56) References Cited

U.S. PATENT DOCUMENTS

| | | | |
|---|---|---|---|
| 2018/0024968 A1* | 1/2018 | Clinchant | G06N 3/0454 706/12 |
| 2018/0247201 A1* | 8/2018 | Liu | G06T 1/00 |
| 2018/0307947 A1* | 10/2018 | Choi | G06K 9/6259 |

OTHER PUBLICATIONS

P. Russo, F. M. Carlucci, T. Tommasi, and B. Caputo, "From source to target and back: symmetric bi-directional adaptive GAN". arXiv Preprint, arXiv:1705.08824, 2017. (Year: 2017).*

(Continued)

*Primary Examiner* — Utpal D Shah
*Assistant Examiner* — Ian L Lemieux
(74) *Attorney, Agent, or Firm* — Hauptman Ham, LLP (57) ABSTRACT

A generative adversarial networks-based or GAN-based method for learning cross-domain relations is disclosed. A provided architecture includes two coupled GANs: a first GAN learning a translation of images from domain A to domain B, and a second GAN learning a translation of images from domain B to domain A. A loop formed by the first GAN and the second GAN causes sample images to be reconstructed into an original domain after being translated into a target domain. Therefore, loss functions representing reconstruction losses of the images may be used to train generative models.

10 Claims, 8 Drawing Sheets

(56) References Cited

OTHER PUBLICATIONS

M.-Y.Liu, T. Breuel, and J. Kautz. "Unsupervised image-to-image translation networks". In Neural Information Processing Systems (NIPS), 2017. 2, 5 (Year: 2017).*

T. Salimans, I. J. Goodfellow, W. Zaremba, V. Cheung, A. Radford, and X. Chen. "Improved techniques for training gans". In Neural Information Processing Systems (NIPS), 2016. 2 (Year: 2016).*

J.-Y.Zhu, T. Park, P. Isola, and A. A. Efros. "Unpaired image-to-image translation using cycle-consistent adversarial networks". In IEEE International Conference on Computer Vision (ICCV), 2017. 1, 2, 7, 8 (Year: 2017).*

T. Zhou, P. Krahenbuhl, M. Aubry, Q. Huang, and A. A. Efros. "Learning dense correspondence via 3d-guided cycle consistency". In CVPR, pp. 117-126,2016 (Year: 2016).*

Ian J. Goodfeloow et al., "Generative adversarial nets", total 9 pages, Advances in Neural Information Processing Systems, 2014.

Andrew L. Maas et al., "Rectifier nonlinearities improve neural network acoustic models", total 6 pages, the 30th International Conference on Machine Learning (ICML), 2013.

Bing Xu et al., "Empirical evaluation of rectified activations in convolution network", total 5 pages, arXiv preprint arXiv:1505:00853, 2015.

Taeksoo Kim et al., "Learning to Discover Cross-Domain Relations with Generative Adversarial Networks", total 10 pages, arXiv.org, Mar. 15, 2017.

* cited by examiner

Learning cross-domain relations without any extra label

FIG. 8A

Handbag images (input) & Generated shoe images (output)

FIG. 8B

Shoe images (input) & Generated handbag images (output)

FIG. 8C

METHOD FOR LEARNING CROSS-DOMAIN RELATIONS BASED ON GENERATIVE ADVERSARIAL NETWORKS

CROSS-REFERENCE TO RELATED APPLICATIONS

The present application is based on, and claims priority from, Korean Patent Application Number 10-2017-0054474, filed Apr. 27, 2017, the disclosure of which is incorporated by reference herein in its entirety.

TECHNICAL FIELD

The present disclosure in some embodiments relates to a generative adversarial networks.

BACKGROUND

The statements in this section merely provide background information related to the present disclosure and do not necessarily constitute prior art.

Manners of interconnections from concepts to concepts, from objects to objects, and from persons to persons, etc. are ubiquitous cross-domain relations. Cross-domain relations are, in many cases, natural things happening to people. For example, we are aware of the relationship between English texts and their French translation and vice versa. In addition, we select the jacket of suit to wear in style coherent to pants and shoes.

The computer' problem of whether it can obtain a human-like capacity to associate domains of two different kinds of images may be reconstructed with a conditional image generation problem. In other words, finding a mapping function from one domain to another is analogous to being responsive to given images in one domain for generating corresponding images in the other domain. Conventionally, such image-to-image translation has been studied mainly by methods in which a training set composed of mutually paired images is used for learning the mapping between the input images and the output images. However, it is very troublesome to prepare paired training data, and the data are unusable in many tasks. The recent introduction of Generative Adversarial Networks (GAN) has led active attempts to apply the algorithm to conditional image generation.

Figure 1:
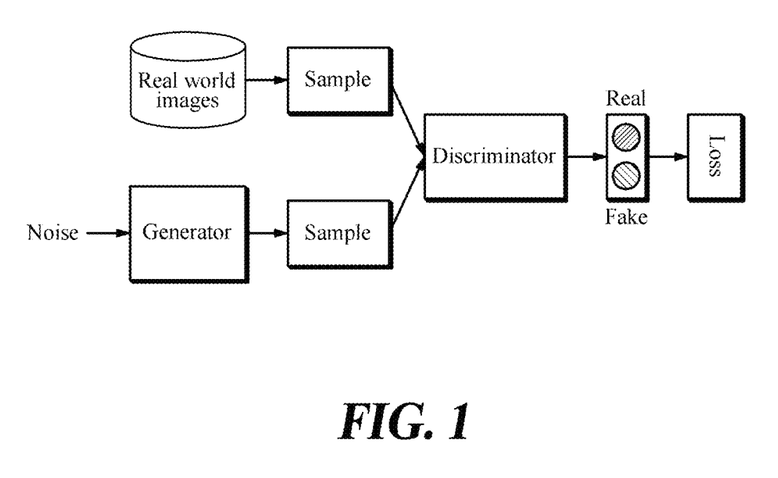
FIG. 1 is a schematic diagram of generative adversarial networks or GAN.

FIG. 1 is a schematic diagram of GAN. GAN was introduced by Non-Patent Document 1, as a relatively new machine learning architecture for a neural network. A machine learning algorithm, GAN belongs to a part of unsupervised learning, and it is a new type of generation model used to generate images. The GAN concept introduces a discriminator network (D), to solve the problem of training a generator network (G). The word "adversarial" refers to two adversarial networks, i.e., "discriminator" and "generator." As illustrated in FIG. 1, the generator tries to generate a more realistic image that can fool the discriminator, while the discriminator continuously adjust parameters to discriminate the images generated by the generator from the real image. In terms of game theory, these networks compete with each other in a zero-sum game.

CITATION LIST

Non-patent document 1: Goodfellow, Ian, et al. "Generative adversarial nets." Advances in Neural Information Processing Systems. 2014.

Non-patent document 2: Maas, A. L., Hannun, A. Y., and Ng, A. Y. Rectifier nonlinearities improve neural network acoustic models. In Proceedings of the 30th International Conference on Machine Learning (ICML), 2013.

Non-patent document 3: Xu, B., Wang, N., T., Chen, and Li, M. Empirical evaluation of rectified activations in convolutional network. In arXiv preprint arXiv:1505:00853, 2015.

SUMMARY

The present disclosure in some embodiments provides a new GAN-based architecture for learning cross-domain relations between two sets of unlabeled images.

In accordance with some embodiments, the present disclosure provides a generative adversarial networks-based or GAN-based architecture in which a first GAN (generative adversarial networks) learns a translation of images in domain A to images in domain B, and a second GAN learns a translation of the images in domain B to the images in domain A. A closed loop formed by the first GAN and the second GAN causes sample images to be reconstructed into an original domain after being translated into an target domain. Therefore, loss functions representing reconstruction losses of the images may be used to learning generative models.

According to one aspect of the present disclosure, a generative adversarial networks-based or GAN-based system is provided for discovering cross-domain relations from two sets of unpaired sample images. The GAN-based system includes a first GAN configured to learn a first generative model for translating images in domain A to images in domain B, and a second GAN configured to learn a second generative model for translating the images in domain B to the images in domain A. The first GAN and the second GAN form a loop such that the sample images in an original domain are translated into a target domain and then translated sample images are reconstructed into the original domain. The first GAN and the second GAN use reconstruction losses of the sample images for learning the first generative model and the second generative model, the reconstruction losses indicating how well the translated sample image has been reconstructed into the original domain.

According to another aspect, a GAN-based system for discovering cross-domain relations from two sets of unpaired sample images includes a first generator configured to learn a first generative model for performing an image-to-image translation from a first domain to a second domain, a first discriminator configured to learn a first discriminative model for discriminating between images translated by the first generator and sample images representing the second domain, a second generator configured to learn a second generative model for performing an image-to-image translation from the second domain to the first domain, and a second discriminator configured to learn a second discriminative model for discriminating between images translated by the second generator and sample images representing the first domain. The first generator and the second generator form a loop such that the sample images in an original domain are translated into a target domain and then translated sample images are reconstructed into the original domain.

The first generator and the second generator respectively iteratively update the first generative model and the second generative model, respectively, so as to minimize reconstruction losses of the sample images and standard GAN generator losses of the sample images. Here, the reconstruction losses indicate how well the translated sample image has been reconstructed into the original domain, and the standard GAN generator losses indicate how realistic the translated images are in a target domain.

In yet another aspect, the present disclosure provides a method of discovering cross-domain relations from two sets of unpaired sample images. The method includes providing a first GAN to perform an unsupervised learning of a first generative model for translating images in domain A to images in domain B, and a second GAN to perform a unsupervised learning of a second generative model for translating the images in domain B to the images in domain A. Here, the first GAN and the second GAN form a loop such that the sample images in an original domain are translated into a target domain and then translated sample images are reconstructed into the original domain. The method uses reconstruction losses in to train the first generative model and the second generative model, the reconstruction losses indicating how well the translated sample image has been reconstructed into the original domain.

In yet another aspect, the present disclosure provides a method of discovering cross-domain relations from two sets of unpaired sample images. The method utilizes a first GAN to perform an unsupervised training of a first generative model for translating images in domain A to images in domain B, and a second GAN to perform a second unsupervised training of a second generative model for translating the images in domain B to the images in domain A. The first GAN and the second GAN is coupled to form a loop such that the sample images in an original domain are translated into a target domain and then translated sample images are reconstructed into the original domain. The method also includes using reconstruction losses in to train the first generative model and the second generative model, the reconstruction losses indicating how well the translated sample image has been reconstructed into the original domain.

DETAILED DESCRIPTION

Some embodiments of the present disclosure are described below with reference to the accompanying exemplary drawings. In the following description, like reference numerals would rather designate like elements, although the elements are shown in different drawings. Further, in the following description of some embodiments, a detailed description of known functions and configurations incorporated herein will be omitted for the purpose of clarity and for brevity and not to obscure the subject matter of the present disclosure.

The present disclosure in some embodiments provides a new GAN-based model that can learn cross-domain relations from unlabeled images. The disclosed model in some embodiments is trained with two sets of images without requiring images with explicit labels (i.e., paired examples) and obviates the need for a prior training. The disclosed model is capable of translating images from one domain to another domain by using learned cross-domain relations.

In short, the present disclosure couples two different GANs together. The respective GANs have generators for mapping the respective domains to their counterpart domains. The key intuition of the present disclosure is to constrain all images in one domain to be representable by images in the other domain. For example, when learning to generate a shoe image based on each handbag image, the disclosed model forces this generated image to be an image-based representation of the handbag image (and hence reconstructs the handbag image) through a reconstruction loss, and to be as close to the images in the shoe domain as possible through a GAN loss. These two properties used encourage bilateral one-to-one (rather than many-to-one or one-to-many) mapping between two domains.

The following describes a formularized definition of cross-domain relations and presents the problem of learning to discover such relations in two different domains. Standard GAN model (proposed by Non-patent document 1) and a similar variant model will be cited as to their applicability for this task, which has limitations to be addressed by the present GANs-based architecture for discovering cross-domain relations.

The cross-domain relation is mathematically defined as a function $G_{AB}$ that maps elements from its domain A to elements in its codomain B, and as a function $G_{BA}$ that is similarly defined. In fully unsupervised setting, functions $G_{AB}$ and $G_{BA}$ may be arbitrarily defined. To find a meaningful relation, a condition needs to be imposed on the relation of interest. Some embodiments constrain relation to be a one-to-one correspondence (i.e., bijective mapping), which means that $G_{AB}$ is the inverse mapping of $G_{BA}$. In other words, the range of function $G_{AB}$, which is the complete set of all possible resulting values $G_{AB}(x_A)$ for all $x_A$'s in domain A, needs to be contained in domain B. Likewise, the range of function $G_{BA}$, which is the complete set of all possible resulting values $G_{BA}(x_B)$ for all $x_B$'s in domain B, needs to be contained in domain A.

The present disclosure relates these constraints to objective functions. Ideally, the equality $G_{BA} \circ G_{AB}(x_A) = x_A$ is satisfied, but this hard constraint is difficult to optimize and a relaxed soft constraint is more desirable in the view of optimization. For this reason, present disclosure provides a model which minimizes the distance $d(G_{BA} \circ G_{AB}(x_A), x_A)$, where any form of metric function ($L_1$, $L_2$, Huber loss, etc.) can be used. Similarly, the disclosed model is designed to minimize $d(G_{AB} \circ G_{BA}(x_B), x_B)$.

Guaranteeing that $G_A$ maps to domain B is also very difficult to optimize. The present disclosure relaxes this constraint by minimizing two generative adversarial losses represented by Equation 1 and Equation 2.

$$-\mathbb{E}_{x_A \sim P_A}[\log D_B(G_{AB}(x_A))] \quad \text{Equation 1}$$

$$-\mathbb{E}_{x_B \sim P_B}[\log D_A(G_{BA}(x_B))] \quad \text{Equation 2}$$

Here, $\mathbb{E}$ is an expectation function, and $x_A$ and $x_B$ are samples of domain A and B, respectively.

The following describes some GAN architectures to be trained with these loss functions. The description for GAN architectures below will use the following notation.

For example, a generator as denoted by $G_A$ is represented by Equation 3 below. Subscripts denote the input and output domains and superscripts denote the input and output image sizes. A discriminator as denoted by $D_B$ is represented by Equation 4 below. In Equation 4 that is [0, 1], subscript B denotes that it discriminates images in domain B. Equations 3 and 4 assume that domains A and B have images of size 64×64×3.

$$G_{AB}: \mathbb{R}_A^{64 \times 64 \times 3} \to \mathbb{R}_B^{64 \times 64 \times 3} \quad \text{Equation 3}$$

$$D_B: \mathbb{R}_B^{64 \times 64 \times 3} \to [0,1] \quad \text{Equation 4}$$

Notations $G_{BA}$ and $D_A$ are used for the other generator and the other discriminator similar to Equations 3 and 4.

Figure 2A:
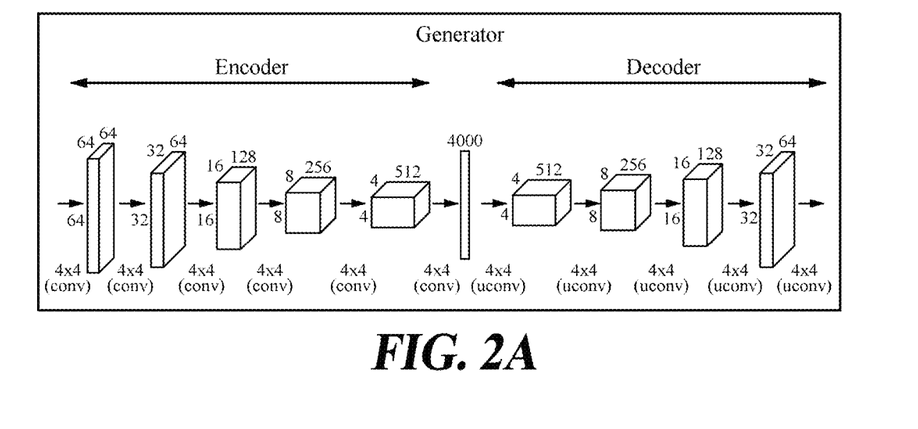
FIG. 2A is an exemplary diagram of a structure of a generator for receiving an image of size 64×64×3 and outputting a translated image of the same size.
Figure 2B:
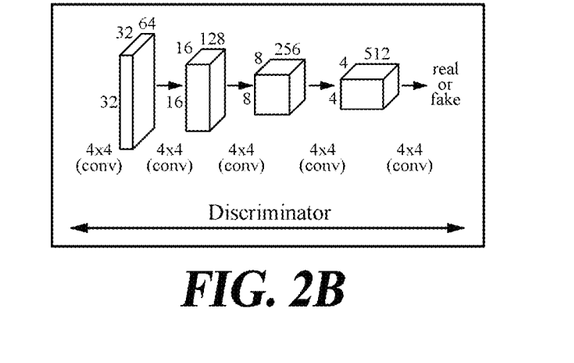
FIG. 2B is an exemplary diagram of a discriminator for discriminating images of size 64×64×3.

FIG. 2A is an exemplary diagram of a structure of a generator for receiving an image of size 64×64×3 and outputting a translated image of the same size, and FIG. 2B is an exemplary diagram of a discriminator for discriminating images of size 64×64×3.

Each generator can be seen as an encoder-decoder pair. The generator may have an encoder section composed of convolution layers with 4×4 filters, each followed by a leaky ReLU (Rectified Linear Unit). The generator may also have a decoder section composed of deconvolution layers with 4×4 filters, followed by a ReLU, and it finally outputs a target domain image of size 64×64×3. The numbers of the convolution and deconvolution layers may range from four to five, depending on the domain. In addition, the dimensions of the convolution and deconvolution layers may be appropriately modified. For detailed descriptions of ReLU and leaky ReLU, Non-Patent Documents 2 and 3 may be consulted.

The discriminator is similar to the encoder section of the generator. Besides the convolution layers and leaky ReLUs, the discriminator has an additional convolution layer with 4×4 filters, and a final sigmoid for outputting a scalar output between [0, 1].

Figure 3:
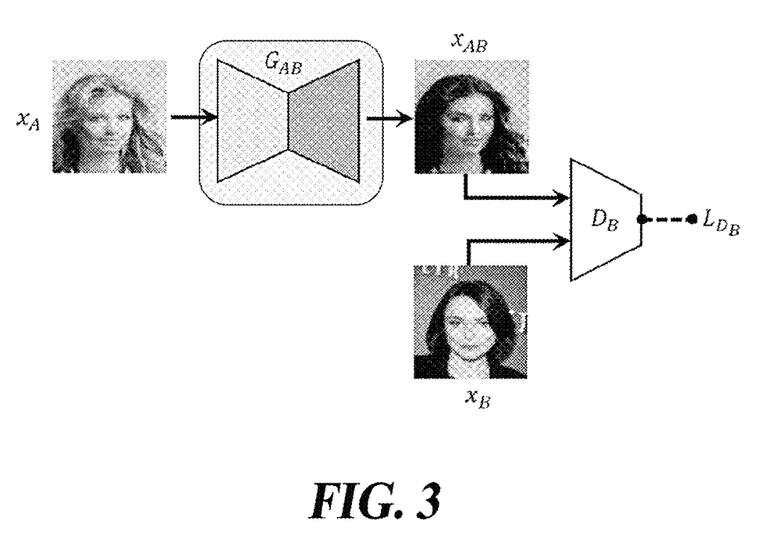
FIG. 3 is a schematic diagram of a standard GAN model-based architecture for a relation discovery process.

FIG. 3 is a schematic diagram of a standard GAN model-based architecture for a relation discovery task.

A standard GAN is supposed to take a random Gaussian noise z, encode it into hidden features h and generate images such as MNIST digits. A slight modification needs to be made to this model to fit the relation discovery task: the modified model takes in an image as input instead of noise, as shown in FIG. 3.

Figure 4:
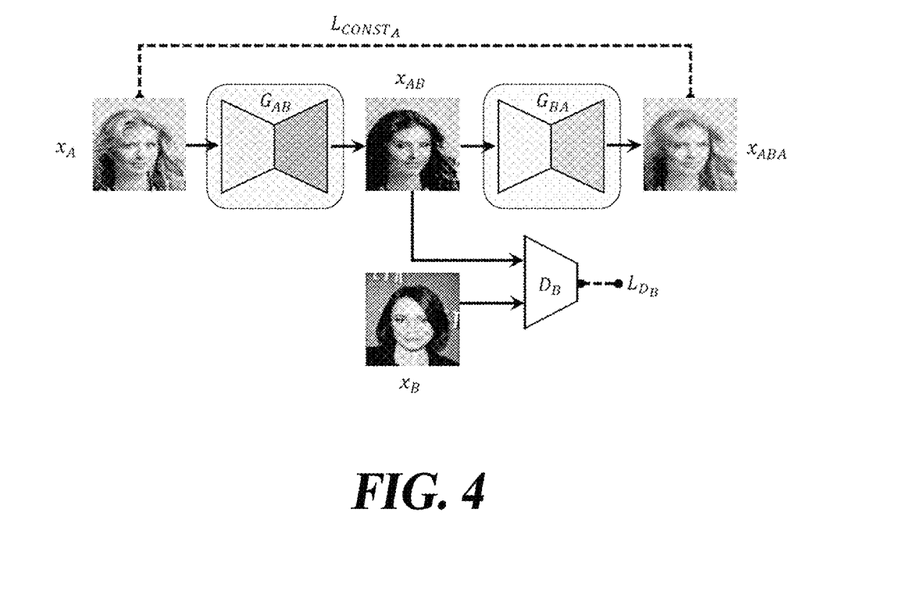
FIG. 4 is a schematic diagram of a GAN architecture with a reconstruction loss.

FIG. 4 is a schematic diagram of a GAN architecture with a reconstruction loss.

Different from the architecture of FIG. 3, which only learns one mapping from domain A to domain B, the architecture of FIG. 4 is provided with a second generator for mapping from domain B back into domain A. Another addition made to the architecture of FIG. 4 is a reconstruction loss term that compares the input image with the reconstructed image. In such GAN architecture with these additional changes, each generator ($G_{AB}$, $G_{BA}$) can learn the mapping from its input domain to output domain and discover relations between the two domains.

Generator $G_{AB}$ translates input image $x_A$ from domain A into $x_{AB}$ in domain B as represented by Equation 5. The generated image $x_{AB}$ is then translated into a domain-A image $x_{ABA}$ to match the original input image $x_A$ as represented by Equation 6. Various forms of distance functions, such as MSE, cosine distance, and hinge-loss, can be used as the reconstruction loss d as represented by Equation 7. The translated output $x_{AB}$ is then scored by discriminator $D_B$ which compares the translated output $x_{AB}$ to a real sample $x_B$ in domain B.

$$x_{AB} = G_{AB}(x_A) \quad \text{Equation 5}$$

$$x_{ABA} = G_{BA}(x_{AB}) = G_{BA} \circ G_{AB}(x_A) \quad \text{Equation 6}$$

$$L_{CONST_A} = d(G_{BA} \circ G_{AB}(x_A), x_A) \quad \text{Equation 7}$$

$$L_{GAN_B} = -\mathbb{E}_{x_A \sim P_A}[\log D_B(G_{AB}(x_A))] \quad \text{Equation 8}$$

Generator $G_{AB}$ receives two types of losses as in Equation 9. A first type is a standard GAN generator loss $L_{GAN_B}$ as represented by Equation 8 that measures how realistic the generated image is in domain B, and a second type is a reconstruction loss $L_{CONST_A}$ as represented by Equation 7 that measures how well the original input is reconstructed after a sequence of two generations. Discriminator $D_B$ receives the standard GAN discriminator loss of Equation 10.

$$T_{G_{AB}} = L_{GAN_B} + L_{CONST_A} \quad \text{Equation 9}$$

$$L_{D_B} = -\mathbb{E}_{x_B \sim P_B}[\log D_B(x_B)]$$

$$-\mathbb{E}_{x_A \sim P_A}[\log(1 - D_B(G_{AB}(x)))] \quad \text{Equation 10}$$

During training, the generator $G_{AB}$ learns the mapping from domain A to domain B under two relaxed constraints: that domain A maps to domain B, and that the mapping on domain B is reconstructed into domain A. However, this model lacks a constraint on mapping from B to A, and these two conditions alone does not guarantee a cross-domain relation because the mapping satisfying these constraints is one-directional. In other words, the mapping is an injection, not bijection, and one-to-one correspondence is not guaranteed.

Figure 5A:
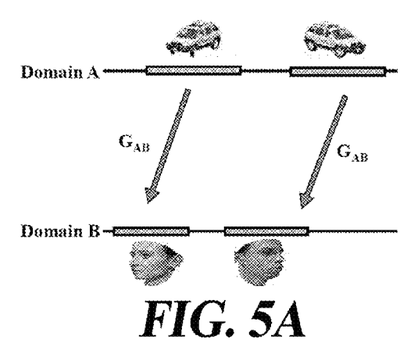
FIG. 5A is a schematic diagram of cross-domain relation discovery models in simplified one-dimensional domains, illustrating the ideal mapping.
Figure 5B:
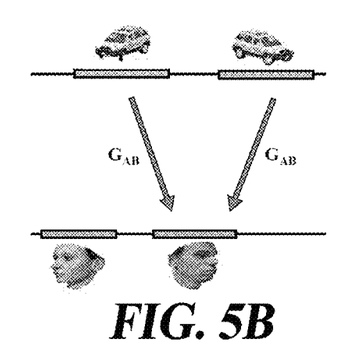
FIG. 5B illustrates a failed standard GAN model mapping.

Considered are the two possibly multi-modal image domains A and B. FIG. 5 illustrates the two multi-modal data domains on a simplified one-dimensional representation. FIG. 5A shows the ideal mapping from input domain A to domain B, where each mode of data is mapped to a separate mode in the target domain. In contrast, FIG. 5B shows the mode collapse problem, a prevalent phenomenon in GANs, where data from multiple modes of a domain map to a single mode of a different domain. For instance, this case is where the mapping $G_{AB}$ maps images of cars in two different orientations into the same mode of face images.

Figure 5C:
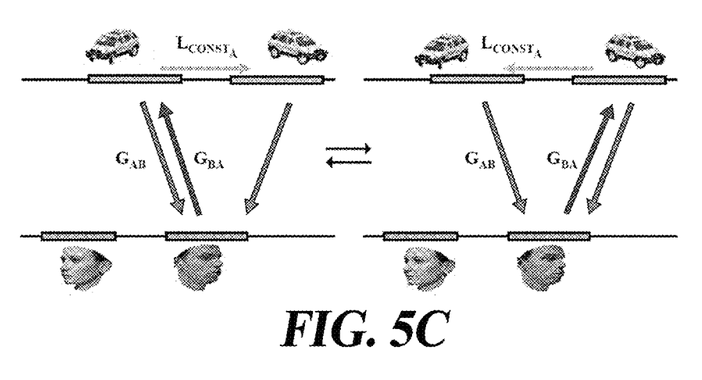
FIG. 5C illustrates a failed mapping by GAN with a reconstruction loss.

In some sense, the architecture of FIG. 4 with the addition of a reconstruction loss to a standard GAN is an attempt to remedy the mode collapse problem. FIG. 5C shows that two domain-A modes are matched with the same domain-B mode, but the same domain-B mode can only direct to one of the two domain-A modes. Although the additional reconstruction loss $L_{CONST_A}$ forces the reconstructed sample to match the original, this change only leads to a similar symmetric problem (FIG. 5C). The reconstruction loss leads to an oscillation between the two symmetrical states and does not resolve mode-collapsing.

Figure 6:
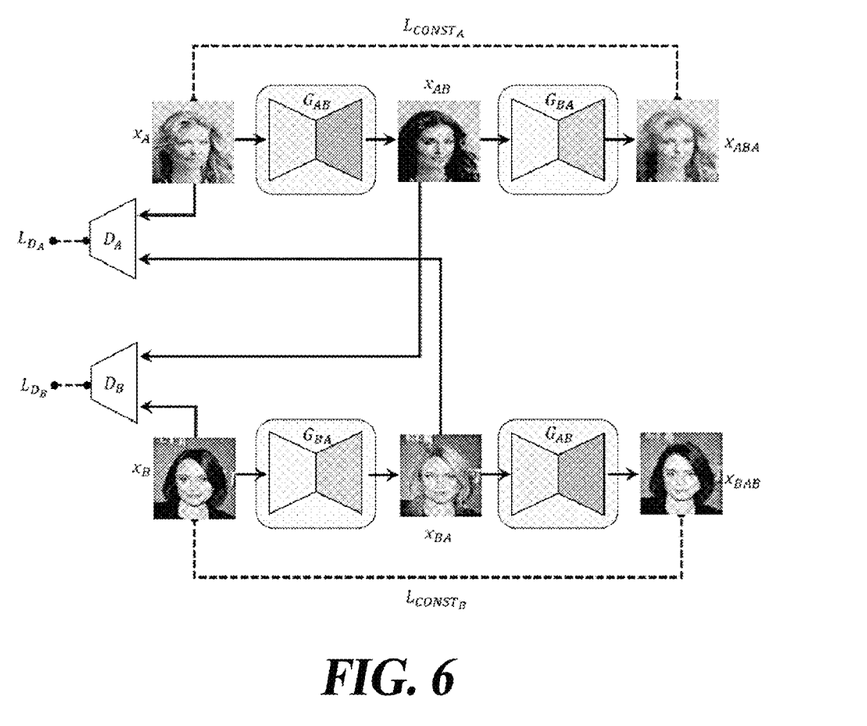
FIG. 6 is a schematic diagram of an overall GANs-based architecture for relations discovery, according to at least one embodiment of the present disclosure.

With reference to FIG. 6, a GANs-based model called DiscoGAN for relation discovery in accordance with at least one embodiment of the present disclosure will be described. FIG. 6 is a conceptual diagram of an overall GAN-based architecture for relation discovery, according to at least one embodiment of the present disclosure.

The architecture of FIG. 6 includes two coupled GAN models, in which two GAN models are coupled to offer two reconstruction losses. The two coupled models, each learns the mapping from one domain to another, and also the reverse mapping back to the one domain for reconstruction. The two GAN models are trained together simultaneously. As FIG. 6 illustrates, a generator $G_{AB}$ is engaged in two translation tasks and generator $G_{BA}$ is engaged in two translation tasks. In other words, the generator $G_{AB}$ translates the sample images $x_A$ in domain A to images $x_{AB}$ in domain B and also translates (i.e., reconstructs) the translated images $x_{BA}$, which are generated by the generator $G_{BA}$, to images $x_{BAB}$ in domain B. Therefore, the generator $G_{AB}$ applies the parameters used for translating the sample images $x_A$ in domain A to the images $x_{BA}$ in domain B, as the common parameters for reconstructing the translated images $x_{BA}$ into domain B.

The generated images $x_{AB}$ and $x_{BA}$ from generators $G_{AB}$ and $G_{BA}$ are each fed into separate discriminators $D_B$ and $D_A$, respectively.

The model of FIG. 6 has at least one key difference from the previous model of FIG. 4 that the sample images ($x_A$, $x_B$) from both domains are translated and then are reconstructed into the original domains and that there are two reconstruction losses: $L_{CONST_A}$ and $L_{CONST_B}$.

As a result of coupling two GAN models, the total generator loss is the sum of GAN losses and reconstruction losses for the respective partial models as presented by Equation 11. Similarly, the total discriminator loss $L_D$ is a sum of discriminator losses of the two discriminators $D_A$ and $D_B$ which discriminate real from fake images in domain A and domain B as presented by Equation 12.

$$L_G = L_{G_{AB}} + L_{G_{BA}}$$
$$= L_{GAN_B} + L_{CONST_A} + L_{GAN_A} + L_{CONST_B}$$

Equation 11

$$L_D = L_{D_A} + L_{D_B}$$

Equation 12

Now, the present model is constrained by two $L_{GAN}$ losses and two $L_{CONST}$ losses. This achieves a bijective mapping, enabling the discovery of a one-to-one correspondence defined by the present disclosure as cross-domain relations.

The generators and the discriminators are alternately and repeatedly trained. For example, in one step, discriminators $D_B$ and $D_A$ are updated (e.g., changing the weight of the value passed between the deconvolution layers) toward minimizing the discriminator losses, and in the subsequent step, generators $G_{AB}$ and $G_{BA}$ are updated (e.g., changing the weight of the value passed between the deconvolution layers) toward minimizing the total generator loss determined by the updated discriminators and expressed by Equation 11.

Figure 7A:
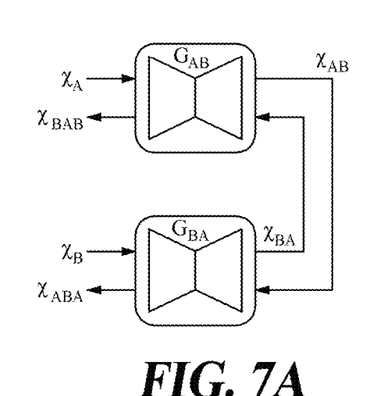
FIGS. 7A and 7B are exemplary schematic diagrams of methods of training generators and discriminators according to at least one embodiment.
Figure 7B:
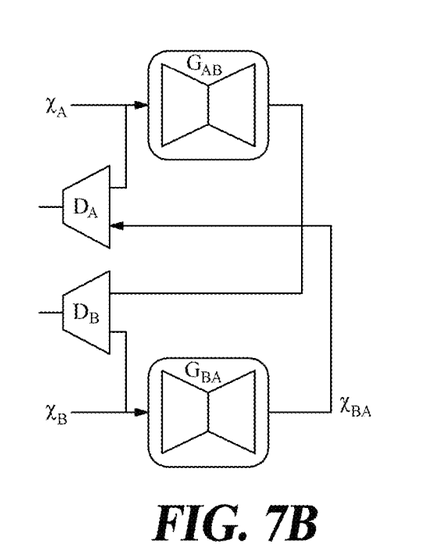

FIGS. 7A and 7B are exemplary schematic diagrams of methods of training generators and discriminators according to at least one embodiment. Illustrative methods of training the GAN-based system shown in FIG. 6 to discover cross-domain relations will be described by using 1000 sample images representing domain A and 1000 images representing domain B.

First, referring to FIG. 7A, a method of training the generators will be described. Upon receiving sample images $x_A$ in domain A, generator $G_{AB}$ outputs translated images $x_{AB}$ to domain B. The translated images $x_{AB}$ are input to generator $G_{BA}$ where they are reconstructed into the original one (i.e., domain A) of domains A and B. Derived from the translated images denoted by $x_{ABA}$ and the original sample images $x_A$ are reconstruction losses $L_{CONST_A}$. The above process is repeated over the representative sample images of domain A as much as, for example, 100 sample images. Generator $G_{AB}$ updates its parameters toward reducing the sum or average of reconstruction losses $L_{CONST_A}$ of the 100 sample images $x_A$. In the same way, reconstruction losses $L_{CONST_B}$ of the 100 sample images $x_B$ representing domain B are obtained, and the parameters of generator $G_{BA}$ are updated toward reducing the sum or average of reconstruction losses $L_{CONST_B}$.

Referring to FIG. 7B, a method of training the discriminators will be described. Upon receiving 100 sample images $x_A$ representative of domain A and 100 translated (by generator $G_{BA}$ updated in the previous stage) domain-A images $x_{BA}$, discriminator $D_A$ generates 200 probabilities. Parameters of discriminator $D_A$ are updated toward reducing the sum or average of 100 probabilities. Likewise, discriminator $D_B$, upon receiving 100 sample images $x_B$ representative of domain B and 100 translated (by generator $G_{AB}$ updated in the previous stage) domain-B images $x_{AB}$, generates 200 probabilities. Parameters of discriminator $D_A$ are updated toward reducing the sum or average of 100 probabilities. Parameters of discriminator $D_B$ are updated toward reducing the sum or average of 100 probabilities.

Calculations for the provision of the sample images, the reconstruction losses and other terms may be carried out by a training module (not shown) having one or more processors and storages. The generators and discriminators are alternately and repeatedly trained, when the set of sample images used in the earlier training stage can be reused in the next training stage, although it is efficient for training to use a new set of sample images.

Figure 8A:
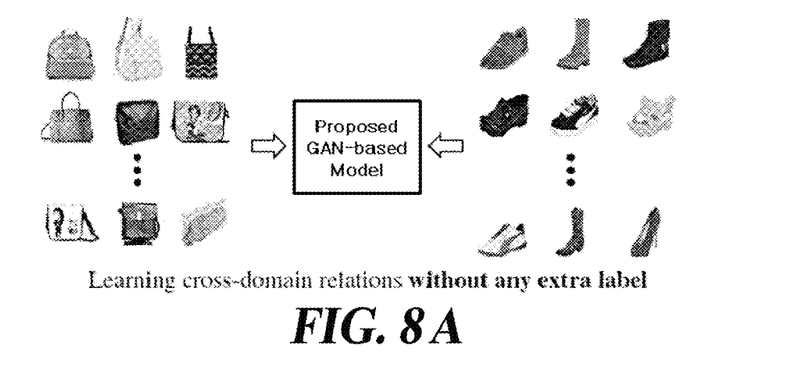
FIGS. 8A to 8C are diagrams of the results of applying a GANs-based model according to at least one embodiment to an image-to-image translation.
Figure 8B:
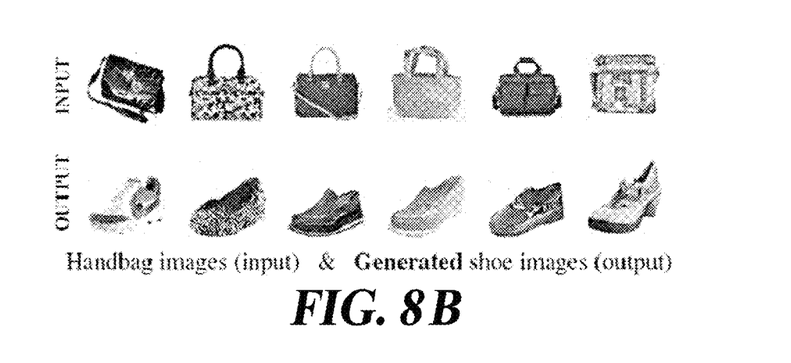
Figure 8C:
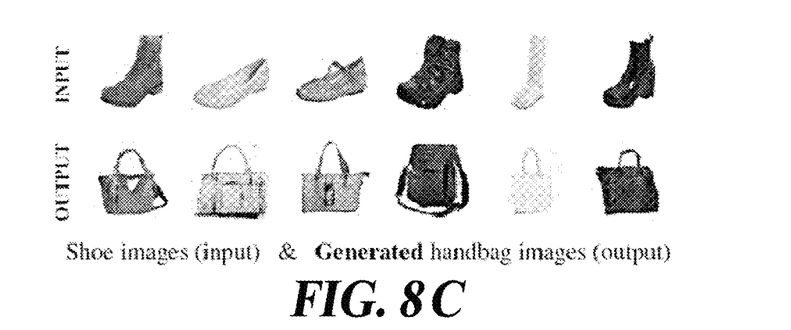

FIGS. 8A to 8C are diagrams of the results of applying a GANs-based model according to at least one embodiment to an image-to-image translation. In some embodiments, the present architecture is capable of simultaneous training of two reliable image-to-image translators respectively performing cross-domain translations of images by using inputs of two sets of unlabeled images (sets of sample images not mutually paired) representing image domains, respectively, as illustrated in FIG. 8A. For example, of two generators, one $G_{AB}$ may be responsive to handbag images for operating as another image-to-image translator that generates shoe images coherent in style to the handbag images, respectively, as illustrated in FIG. 8B. The other generator $G_{BA}$ may be responsive to shoe images for operating as an image-to-image translator that generates handbag images coherent in style to the shoe images, respectively, as illustrated in FIG. 8C.

Neural networks according to the architecture provided by some embodiments of the present disclosure can be trained to discover relations between two different domains from two sets of unlabeled images. Using the discovered relations, the neural networks can transmit styles from one domain to the other domain successfully, while maintaining the key attributes such as orientations, facial identities, etc.

The provided architecture resolves all the issues of mode collapse and mode oscillation.

Architecture provided by the present disclosure is capable of simultaneous training of two reliable image-to-image translators respectively performing cross-domain translations of images by using inputs of two sets of unlabeled images representing image domains, respectively, and it can perform various image translation processing.

The aforementioned GAN-based method of discovering cross-domain relations may be implemented as computer-readable codes in a computer-readable recording medium. The computer-readable recording medium includes all kinds of recording devices storing data that can be read by a computer system. In other words, the computer-readable recording medium includes a magnetic recording medium (e.g., ROM, floppy disks, hard disks, etc.), and a storage medium such as an optically readable media (e.g., CD-ROM, DVD, etc.). Further, the computer-readable recording medium can be distributed in computer systems connected via a network, and computer-readable codes can be stored and executed in a distributed mode.

Although exemplary embodiments of the present disclosure have been described for illustrative purposes, those skilled in the art will appreciate that various modifications, additions and substitutions are possible, without departing from the various characteristics of the disclosure. Therefore, exemplary embodiments of the present disclosure have been described for the sake of brevity and clarity. Accordingly, one of ordinary skill would understand the scope of the disclosure is not limited by the explicitly described above embodiments but by the claims and equivalents thereof. The scope of protection of the present embodiments is to be construed by the following claims, and all the technical ideas within the scope of their equivalents should be construed as being included in the scope of the embodiments.

What is claimed is:

1. A generative adversarial networks-based or GAN-based system for discovering cross-domain relations from two sets of unpaired sample images, the GAN-based system comprising:
   a first GAN configured to learn a first generative model for translating images from domain A to domain B; and
   a second GAN configured to learn a second generative model for translating images from domain B to domain A,
   wherein the first GAN and the second GAN form a loop such that the sample images in an original domain are translated into a target domain and then translated sample images are reconstructed into the original domain, and
   wherein the first GAN and the second GAN use reconstruction losses of the sample images for learning the first generative model and the second generative model, the reconstruction losses indicating how well the translated sample image has been reconstructed into the original domain.

2. The GAN-based system of claim 1, wherein the reconstruction loss is calculated by a distance function representing a difference between the sample image and the reconstructed image.

3. The GAN-based system of claim 1, wherein the first GAN and the second GAN each comprises:
   a generator configured to learn a generative model for translating images in the original domain in the target domain, and
   a discriminator configured to learn a discriminative model for discriminating between translated images generated by the generator and sample images in the target domain.

4. The GAN-based system of claim 3, wherein the first GAN and the second GAN iteratively update the first generative model and the second generative model, respectively, so as to minimize the reconstruction losses and standard GAN generator losses indicating how realistic the translated images are in the target domain.

5. The GAN-based system of claim 4, wherein the standard GAN generator loss is defined for each GAN by $$-\mathbb{E}_{x_A \sim P_A}[\log D_B(G_{AB}(x_A))] \text{ and } -\mathbb{E}_{x_B \sim P_B}[\log D_A(G_{BA}(x_B))]$$

where $\mathbb{E}$ denotes an expectation function, $x_A$ and $x_B$ denote sample images in domains A and B, $G_{AB}$ and $G_{BA}$ denote generative models of the first GAN and the second GAN respectively, and $D_A$ and $D_B$ denote discriminative models of the second GAN and the first GAN respectively.

6. The GAN-based system of claim 3, wherein the generator comprises:
   an encoder including a plurality of convolution layers; and
   a decoder including a plurality of deconvolution layers.

7. The GAN-based system of claim 3, wherein the discriminator comprises:
   an encoder including a plurality of deconvolution layers and a sigmoid.

8. A generative adversarial networks-based or GAN-based system for discovering cross-domain relations from two sets of unpaired sample images, the GAN-based system comprising:
   a first generator configured to learn a first generative model for performing an image-to-image translation from a first domain to a second domain;
   a first discriminator configured to learn a first discriminative model for discriminating between images translated by the first generator and sample images representing the second domain;
   a second generator configured to learn a second generative model for performing an image-to-image translation from the second domain to the first domain; and
   a second discriminator configured to learn a second discriminative model for discriminating between images translated by the second generator and sample images representing the first domain,
   wherein the first generator and the second generator form a loop such that the sample images in an original domain are translated into a target domain and then translated sample images are reconstructed into the original domain, and
   wherein the first generator and the second generator iteratively update the first generative model and the second generative model, respectively, so as to minimize reconstruction losses of the sample images and standard GAN generator losses of the sample images, the reconstruction losses indicating how well the translated sample image has been reconstructed into the original domain, and the standard GAN generator losses indicating how realistic the translated images are in a target domain.

9. The GAN-based system of claim 8, wherein the reconstruction loss is calculated by a distance function representing a difference between an original sample image and a corresponding reconstructed image.

10. A method of discovering cross-domain relations from two sets of unpaired sample images, the method comprising:
   providing a first GAN (generative adversarial networks) to perform an unsupervised learning of a first generative model for translating images from domain A to domain B, and a second GAN to perform a second unsupervised learning of a second generative model for translating the images from domain B to domain A;

configuring the first GAN and the second GAN to form a loop such that the sample images in an original domain are translated into a target domain and then translated sample images are reconstructed into the original domain; and using reconstruction losses to train the first generative model and the second generative model, the reconstruction losses indicating how well the translated sample image has been reconstructed into the original domain.

\* \* \* \* \*